(12) United States Patent
Shao et al.

(10) Patent No.: US 11,384,559 B1
(45) Date of Patent: Jul. 12, 2022

(54) POWER TRANSMISSION TOWER HAVING ELEVATABLE TRUSSES

(71) Applicant: MINJIANG UNIVERSITY, Fuzhou (CN)

(72) Inventors: Zhenhua Shao, Fuzhou (CN); Wenru Lin, Fuzhou (CN); Yeyu Lin, Fuzhou (CN)

(*) Notice: Subject to any disclaimer, the term of this patent is extended or adjusted under 35 U.S.C. 154(b) by 0 days.

(21) Appl. No.: 17/214,956

(22) Filed: Mar. 29, 2021

(51) Int. Cl.
| | |
|---|---|
| *E04H 12/18* | (2006.01) |
| *E04H 12/10* | (2006.01) |
| *F16H 19/02* | (2006.01) |
| *H02G 7/14* | (2006.01) |
| *E04H 12/34* | (2006.01) |

(52) U.S. Cl.
CPC ............ *E04H 12/18* (2013.01); *F16H 19/02* (2013.01); *H02G 7/14* (2013.01); *E04H 12/10* (2013.01); *E04H 12/34* (2013.01); *E04H 12/344* (2013.01)

(58) Field of Classification Search
CPC ..... E04H 12/34; E04H 12/344; E04H 12/348; E04H 12/18; E04H 12/00; E04H 12/08; E04H 12/10; E04H 12/20; E04H 12/24; F16H 19/02; H02G 7/14
See application file for complete search history.

(56) References Cited

U.S. PATENT DOCUMENTS

| | | | | |
|---|---|---|---|---|
| 1,031,511 | A * | 7/1912 | Chapman | A47G 25/66 223/63 |
| 1,644,499 | A * | 10/1927 | Trout | E21B 15/00 52/123.1 |
| 1,847,460 | A * | 3/1932 | Austin | H01B 17/42 361/118 |
| 2,261,013 | A * | 10/1941 | Berby | E04H 12/18 187/242 |
| 3,062,336 | A * | 11/1962 | Baxter | E04H 12/10 52/223.4 |
| 3,182,761 | A * | 5/1965 | Goodrum | E04H 12/10 52/116 |
| 3,204,721 | A * | 9/1965 | Park | E04H 12/00 182/115 |
| 3,656,631 | A * | 4/1972 | Rauch | B66C 23/20 212/294 |
| 3,894,635 | A * | 7/1975 | Reich | B66C 23/283 212/176 |
| 4,205,826 | A * | 6/1980 | Ten Broeke | B66C 23/32 254/105 |
| 5,570,546 | A * | 11/1996 | Butterworth | E04H 12/34 343/890 |
| 6,026,627 | A * | 2/2000 | Moore | E04H 12/10 52/651.02 |
| 7,147,117 | B2 * | 12/2006 | Davis | B66C 23/32 212/179 |

(Continued)

*Primary Examiner* — Phi D A

(57) ABSTRACT

Disclosed is a power transmission tower having elevatable trusses. The power transmission tower has a tower head, a tower body, and a tower leg. The power transmission tower comprises a truss set symmetrically arranged at both sides of the tower body and an elevating device which is capable of driving the displacement of the truss set. The elevating device comprises a power unit arranged within the tower body, and a linear slide module secured to side of the tower body. The linear slide module is connected to the power unit and the truss set, respectively.

5 Claims, 3 Drawing Sheets

(56) References Cited

U.S. PATENT DOCUMENTS

| | | | |
|---|---|---|---|
| 7,253,786 B1* | 8/2007 | Logozzo | E04H 12/08 |
| | | | 343/890 |
| 2008/0184653 A1* | 8/2008 | Bauman | E04C 3/32 |
| | | | 52/651.01 |
| 2014/0260076 A1* | 9/2014 | Yustus | E04H 12/10 |
| | | | 52/745.18 |
| 2014/0318040 A1* | 10/2014 | Edwards | E04H 12/34 |
| | | | 52/118 |
| 2017/0107735 A1* | 4/2017 | Wasterval | E04H 12/00 |
| 2017/0183888 A1* | 6/2017 | Abe | E04H 12/182 |
| 2019/0292804 A1* | 9/2019 | Kensinger | E04H 12/20 |

* cited by examiner

POWER TRANSMISSION TOWER HAVING ELEVATABLE TRUSSES

TECHNICAL FIELD

The present disclosure relates to the technical field of power transmission tower, and especially to a power transmission tower having elevatable trusses.

BACKGROUND

At present, transmission towers are used as power transmission carriers, and are generally constructed in areas having complicate terrain and climate. The power transmission tower cable system is extremely sensitive to the wind and is susceptible to the influence of wind loads. A little wind load may greatly affect the power transmission tower line. When subjected to wind loads, the cables on the power transmission tower will drive the insulator string to sway in irregular directions, thereby affecting the vibration amplitude of the power transmission tower. After long-term use or in special circumstances such as strong winds may shift, bend or even break the power transmission power.

SUMMARY OF THIS DISCLOSURE

The present disclosure provides a power transmission tower having elevatable trusses to solve the above problems.

The provided power transmission tower is specified as follows.

The power transmission tower having elevatable trusses has a tower head, a tower body, and a tower leg. The power transmission tower comprises a truss set symmetrically arranged at both sides of the tower body and an elevating device which is capable of driving the displacement of the truss set. The elevating device comprises a power unit arranged within the tower body, and a linear slide module secured to side of the tower body. The linear slide module is connected to the power unit and the truss set, respectively.

In some embodiments, the linear slide module comprises a first linear slide set symmetrically arranged on sides of the tower body, and a second linear slide set provided on outer side of the first linear slide set and arranged symmetrically on sides of the tower body.

In some embodiments, the truss set includes: a first truss, fixed at the bottom of the side of the tower body; a second truss, arranged above the first truss and connected to the first linear slide set; and a third truss, arranged above the second truss and connected to the second linear slide set.

In some embodiments, the power unit comprises a motor, a first transmission shaft connected to the motor, second transmission shafts separately connected to both ends of the first transmission shaft, and gear sets arranged at both ends of the second transmission shaft. The gear set is connected to the linear slide module.

In some embodiments, the gear set comprises a first bevel gear secured to both ends of the second transmission shaft, a second bevel gear perpendicularly connected to the first bevel gear, a third bevel gear perpendicularly connected to the first bevel gear, and a gear box connected to the third bevel gear. The second bevel gear is connected to the first linear slide set. The gear box is connected to the second linear slide set.

In some embodiments, the first truss, the second truss and the third truss are respectively provided with an insulator.

The beneficial effect of the present invention is that a linear slide module is used between the tower body and the truss set for connection. When there is a storm, the power transmission tower activates the defense function under the control of the system, that is, the power unit simultaneously drives the first linear slide set and the second linear slide set, make the second truss and the third truss move towards the first truss respectively. Because of the presence of the gear box, when the second truss and the third truss is stopped at the same time, the second truss is close to the first truss and the third truss is close to the second truss. Finally, the cables on different trusses are close to each other, and the shaking amplitude of the transmission tower is reduced. The first linear slide set and the second linear slide set are arranged diagonally and staggered, and each linear slide set is provided with a separate power drive. In contrast to the combined driving method of a motor and a gear transmission device, in the present disclosure, friction and resistance generated during the movement of the linear slide set are greatly reduced, and the arrangement of the linear slide set makes the overall force more uniform. The structure of the present disclosure is ingeniously designed, which greatly improves the adaptability and practicability of the present power transmission tower to bad weather.

BRIEF DESCRIPTION OF THE DRAWINGS

In order to explain the embodiments of the present disclosure more clearly, the following will briefly introduce the drawings that need to be used in the embodiments. It should be understood that the following drawings only show some embodiments of the present disclosure, and therefore should not be considered as limiting the scope. For those of ordinary skill in the art, without creative work, other related drawings may be obtained from these drawings.

In the drawings.

1—tower body; 2—truss set; 21—first truss; 22—second truss; 23—third truss; 3—elevating device; 31—power unit; 311—motor; 312—first transmission shaft; 313—second transmission shaft; 314—gear set; 3141—first bevel gear; 3142—second bevel gear; 3143—third bevel gear; 3144—gear box; 32—linear slide module; 321—first linear slide set; 322—second linear slide set; 4—insulator

DETAILED DESCRIPTION OF THE DISCLOSURE

In order to make the objectives, technical solutions, and advantages of the embodiments of the present invention clearer, the technical solutions in the embodiments of the present invention will be described clearly and completely in conjunction with the accompanying drawings in the embodiments of the present invention. Obviously, the described embodiments are part of the embodiments of the present invention, rather than all of them. Based on the embodiments of the present invention, all other embodiments obtained by those of ordinary skill in the art without creative work shall fall within the protection scope of the present invention. Therefore, the following detailed description of the embodiments of the present invention provided in the accompanying drawings is not intended to limit the scope of the claimed invention, but merely represents selected embodiments of the present invention. Based on the embodiments of the present invention, all other embodiments obtained by those of ordinary skill in the art without creative work shall fall within the protection scope of the present invention.

In the description of the present invention, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of the present invention, "plurality" means two or more, unless otherwise specifically defined.

Figure 1:
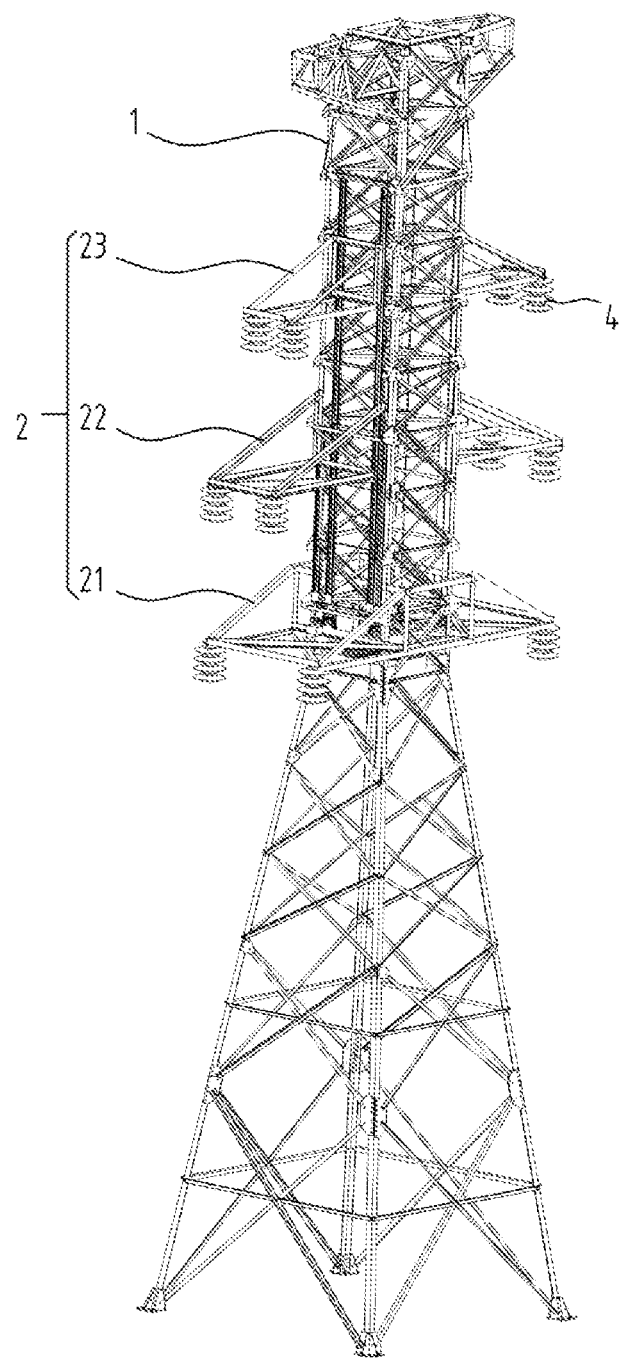
FIG. 1 is a schematic diagram of the power transmission tower according to embodiments of the present disclosure.
Figure 2:
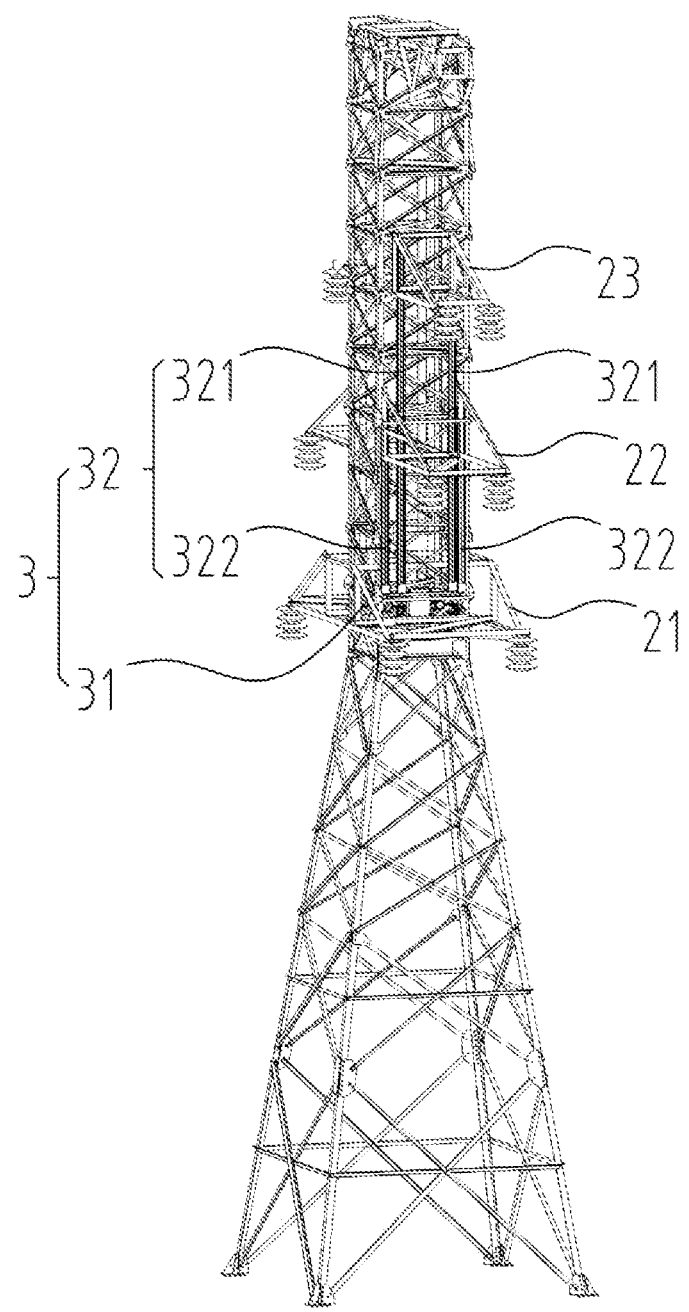
FIG. 2 is a schematic diagram of the linear slide module and the truss set according to embodiments of the present disclosure.
Figure 3:
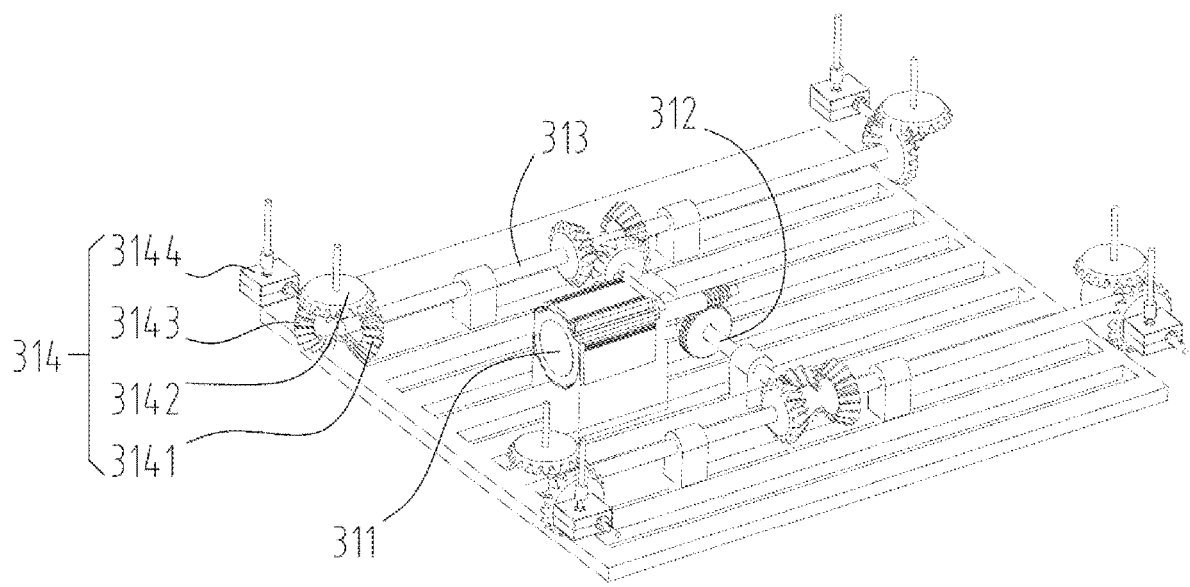
FIG. 3 is a schematic diagram of the power unit according to embodiments of the present disclosure.

As shown in FIG. 1 to FIG. 3, the power transmission tower having elevatable trusses has a tower head, a tower body 1, and a tower leg. The power transmission tower comprises a truss set 2 symmetrically arranged at both sides of the tower body 1 and an elevating device 3 which is capable of driving the displacement of the truss set 2. The elevating device 3 comprises a power unit 31 arranged within the tower body 1, and a linear slide module 32 secured to side of the tower body 1. The linear slide module 32 is connected to the power unit 31 and the truss set 2, respectively. The linear slide module 32 comprises a first linear slide set 321 symmetrically arranged on sides of the tower body 1, and a second linear slide set 322 provided on outer side of the first linear slide set 321 and symmetrically arranged on sides of the tower body 1. The truss set 2 includes: a first truss 21, fixed at the bottom of the side of the tower body 1; a second truss 22, arranged above the first truss 21 and connected to the first linear slide set 321; and a third truss 23, arranged above the second truss 22 and connected to the second linear slide set 322. The linear slide set is adopted to improve the movement accuracy and stability of the truss. In the event of windy weather protection, the linear slide module 32 is driven by the power unit 31 to drive the truss set 2, so that the second truss 22 and the third truss 23 approach the first truss 21, and the distance between cables can be shorten, and the shaking amplitude of the transmission tower can be reduced. Similarly, when the windy weather subsides, the linear slide module 32 is driven by the power unit 31 to drive the truss set 2, so that the second truss 22 and the third truss 23 move away from the first truss 21, so that the cables are pulled a certain distance to return to their normal state.

Referring to FIG. 2 and FIG. 3, the power unit 31 comprises a motor 311, a first transmission shaft 312 connected to the motor 311, second transmission shafts 313 separately connected to both ends of the first transmission shaft 312, and gear sets 314 arranged at both ends of the second transmission shaft 313. The gear set 313 is connected to the linear slide module 32. The gear set 314 comprises a first bevel gear 3141 secured to both ends of the second transmission shaft 313, a second bevel gear 3142 perpendicularly connected to the first bevel gear 3141, a third bevel gear 3143 perpendicularly connected to the first bevel gear 3141, and a gear box 3144 connected to the third bevel gear 3143. The second bevel gear 3142 is connected to the first linear slide set 321. The gear box 3144 is connected to the second linear slide set 322. Since the distance of the second truss 22 and the truss 21 and the distance of the third truss 23 and the first truss 21 are different, and the third truss 23 and the second truss 22 are controlled by the same motor 311 to move up and down, the gearbox 3144 is used to adjust the third truss 23 The moving speed is such that when the second truss 22 and the third truss 23 stop at the same time, the second truss 22 is close to the first truss 21 and the third truss 23 is close to the second truss 22.

Referring to FIG. 1, the first truss 21, the second truss 22 and the third truss 23 are respectively provided with insulators 4. The purpose of the insulator 4 is to insulate between the wires or between the wires and the ground, to ensure that the circuit has a reliable electrical insulation strength, and to fix the wires and bear the vertical and horizontal loads of the wires.

The working principle of a power transmission tower provided by the present disclosure is: when there is a storm, the power transmission tower activates the defense function under system control, that is, the power unit simultaneously drives the first linear slide set 321 and the second linear slide set 322 makes the second truss 22 and the third truss 23 move towards the first truss 21 respectively. Because of the presence of the gear box 3144, when the second truss 22 and the third truss 23 are stopped at the same time, the second truss 22 is close to the first truss 21 and the third truss 23 is close to the second truss 22. Finally, the cables on different trusses are close to each other, and the shaking amplitude of the transmission tower is reduced.

The above descriptions are only the preferred embodiments of the present disclosure and are not intended to limit the present disclosure. For those skilled in the art, the present disclosure may have various modifications and changes. Any modification, equivalent replacement, improvement, etc. made within the spirit and principle of the present disclosure shall be included in the protection scope of the present disclosure.

What is claimed is:

1. A power transmission tower having elevatable trusses, wherein the power transmission tower comprises a tower head, a tower body, and a tower leg; the power transmission tower further comprises:
   a truss set symmetrically arranged at both sides of the tower body, and
   an elevating device which is capable of driving the displacement of the truss set;
   the elevating device comprises a power unit arranged within the tower body, and a linear slide module secured to side of the tower body;
   the linear slide module is connected to the power unit and the truss set, respectively;
   the linear slide module comprises:
   a first linear slide set symmetrically arranged on sides of the tower body, and
   a second linear slide set provided on outer side of the first linear slide set and arranged symmetrically on sides of the tower body.

2. The power transmission tower according to claim 1, wherein the truss set comprises:
   a first truss, fixed at the bottom of the side of the tower body;
   a second truss, arranged above the first truss and connected to the first linear slide set; and
   a third truss, arranged above the second truss and connected to the second linear slide set.

3. The power transmission tower according to claim 1, wherein the power unit comprises:
   a motor,
   a first transmission shaft connected to the motor,
   second transmission shafts separately connected to both ends of the first transmission shaft, and
   gear sets arranged at both ends of the second transmission shaft; the gear set is connected to the linear slide module.

4. The power transmission tower according to claim 3, wherein the gear set comprises:
- a first bevel gear secured to both ends of the second transmission shaft,
- a second bevel gear perpendicularly connected to the first bevel gear,
- a third bevel gear perpendicularly connected to the first bevel gear, and
- a gear box connected to the third bevel gear;
- the second bevel gear is connected to the first linear slide set; the gear box is connected to the second linear slide set.

5. The power transmission tower according to claim 2, wherein the first truss, the second truss and the third truss are respectively provided with an insulator.

* * * * *